(12) United States Patent
Lawrey et al.

(10) Patent No.: US 7,511,111 B2
(45) Date of Patent: Mar. 31, 2009

(54) POLYURETHANE ELASTOMERS HAVING IMPROVED PHYSICAL PROPERTIES AND A PROCESS FOR THE PRODUCTION THEREOF

(75) Inventors: Bruce D. Lawrey, Moon Township, PA (US); Kurt C. Frisch, Woodstock, CT (US); Nigel Barksby, Moon Township, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 11/374,789

(22) Filed: Mar. 14, 2006

(65) Prior Publication Data

US 2006/0149021 A1    Jul. 6, 2006

Related U.S. Application Data

(60) Continuation-in-part of application No. 10/932,807, filed on Sep. 2, 2004, now Pat. No. 7,045,650, which is a division of application No. 10/094,238, filed on Mar. 8, 2002, now Pat. No. 6,824,703.

(51) Int. Cl.
| | |
|---|---|
| C08G 18/12 | (2006.01) |
| C08G 18/10 | (2006.01) |
| C08G 18/48 | (2006.01) |
| C08G 18/32 | (2006.01) |
| C08G 18/40 | (2006.01) |

(52) U.S. Cl. .............................. 528/59; 528/61; 528/65; 528/66; 528/76; 528/77

(58) Field of Classification Search .................... 528/59, 528/61, 65, 66, 76, 77
See application file for complete search history.

(56) References Cited

U.S. PATENT DOCUMENTS

| | | | | |
|---|---|---|---|---|
| 5,648,447 A | | 7/1997 | Seneker et al. ................. 528/63 |
| 5,668,239 A | | 9/1997 | Nodelman et al. ............. 528/60 |
| 5,670,601 A | * | 9/1997 | Allen et al. .................... 528/76 |
| 5,677,413 A | * | 10/1997 | Barksby et al. ............... 528/65 |
| 5,696,221 A | * | 12/1997 | Barksby et al. ............... 528/64 |
| 5,708,118 A | * | 1/1998 | Seneker et al. ............... 528/61 |
| 5,728,745 A | * | 3/1998 | Allen et al. ................... 521/159 |
| 5,739,253 A | | 4/1998 | Nodelman et al. ............. 528/60 |
| 5,792,829 A | * | 8/1998 | Allen et al. ................... 528/419 |
| 5,843,357 A | * | 12/1998 | Seneker et al. ............... 264/204 |
| 5,849,944 A | * | 12/1998 | Allen et al. .................... 560/26 |
| 5,965,778 A | * | 10/1999 | Allen et al. .................. 568/620 |
| 6,008,263 A | * | 12/1999 | Thompson et al. ........... 521/174 |
| 6,066,683 A | * | 5/2000 | Beisner et al. ............... 521/174 |
| 6,420,445 B1 | * | 7/2002 | Barksby et al. ............... 521/159 |
| 6,824,703 B2 | * | 11/2004 | Lawrey et al. ........... 252/182.25 |
| 7,045,650 B2 | * | 5/2006 | Lawrey et al. ................. 560/26 |

FOREIGN PATENT DOCUMENTS

WO          93/24549          12/1993

* cited by examiner

*Primary Examiner*—Rabon Sergent
(74) *Attorney, Agent, or Firm*—Lyndanne M. Whalen

(57) ABSTRACT

A polyol composition having a number average molecular weight of from about 1,000 to about 3,000 Daltons is made up of (1) at least 55% by weight of a low monol polyoxypropylene polyol having a number average molecular weight of from about 1,000 to 12,000 Da and a degree of unsaturation less than or equal to 0.02 meq/g and (2) no more than 45% by weight of a polyol having a number average molecular weight of from about 400 to about 1,000 Da and a polydispersity index greater than 1.1. This polyol composition is reacted with a diisocyanate, a polyisocyanate, an isocyanate-terminated prepolymer or an isocyanate-terminated quasi-prepolymer to produce polyurethanes, particularly, polyurethane elastomers having good physical and mechanical properties. Any of the known processes for producing polyurethanes, particularly, elastomers, including one-shot processes, may be used to produce polyurethanes in accordance with the present invention.

14 Claims, No Drawings

US 7,511,111 B2

POLYURETHANE ELASTOMERS HAVING IMPROVED PHYSICAL PROPERTIES AND A PROCESS FOR THE PRODUCTION THEREOF

CROSS-REFERENCE TO RELATED APPLICATION

This application is a continuation-in-part of application Ser. No. 10/932,807 filed Sep. 2, 2004, which is now U. S. Pat. No. 7,045,650, which is a division of 10/094,238 filed Mar. 8, 2002, which is now U.S. Pat. No. 6,824,703.

BACKGROUND OF THE INVENTION

The present invention relates to polyurethane elastomers and to a process for the production thereof. More particularly, the present invention relates to polyurethane elastomers having improved physical properties, the polyol component and isocyanate-terminated prepolymer or quasi-prepolymer used to produce such elastomers, and to a one-shot process for producing polyurethane elastomers from these materials. Preferably, these elastomers are prepared by chain extending an isocyanate-terminated prepolymer or quasi-prepolymer prepared from a polyol component having a number average molecular weight of from about 1000 to about 3000 Da. This polyol component includes a low molecular weight polyol having a high polydispersity index and a low monol polypropylene glycol.

Polyurethane elastomers are widely used in such diverse applications as gasketing and sealing materials, medical devices, ski boots, jounce bumpers, and conveyor rollers, to name a few. Due to their strength, hardness, and other properties, elastomers prepared from isocyanate-terminated prepolymers or quasi-prepolymers incorporating polytetramethylene ether glycol (PTMEG), polycaprolactone and polyester polyols are predominantly used for demanding applications.

PTMEG, polycaprolactone and polyester polyols tend to be high cost starting materials, however. As a result, polyurethane elastomers prepared from these polyol components are also higher priced products.

Polyoxypropylene diols have been suggested as possible substitutes for PTMEG in elastomer prepolymer formulations, however, the properties of the elastomers thus produced are not comparable to those achieved with PTMEG.

The patent literature teaches the benefits of using low unsaturation polyoxypropylene diols but also recognizes that production of elastomers with such polyols yields products that exhibit low modulus values, low hardness values, low compression deflection and abrasion resistance and presents processing problems.

One approach which has been taken to improve these physical properties and to reduce or eliminate the processing problems encountered with such low unsaturation polyols is the use of a blend of polyols. U.S. Pat. No. 5,648,447, for example, discloses polyurethane elastomers produced from a prepolymer made with a polyol component containing both PTMEG and from 5 to 35 equivalent percent of a low monol polyoxypropylene polyol which is chain extended with an aliphatic diol or an aromatic amine. It is, however, taught in this patent that if more than 35 equivalent percent of low monol polyoxypropylene diol is used, tensile strength of the elastomer rapidly diminishes and elongation values are worse than those for elastomers made using only low monol polyoxypropylene diol. The economic benefit of using low monol polyoxypropylene diols is not therefore fully achieved due to the requirement that less than 35 equivalent percent of such diol be used if tensile strength and elongation values are to be maintained.

It has also been found that approximately 20% more isocyanate (specifically, MDI) is needed in systems such as those disclosed in U.S. Pat. No. 5,648,447 to achieve the same degree of hardness as that obtained using comparable PTMEG systems. Further, the optimum mechanical properties are achieved only if the chain extension of the prepolymer is sufficiently catalyzed that the effective potlife of the system is approximately 2 minutes or less. Elastomers which require processing times of longer than 2 minutes can not therefore be produced with such systems without sacrificing the mechanical properties of the product elastomer.

Among the known processes used to produce polyurethane elastomers, one-shot processes are considered to be particularly advantageous. U.S. Pat. Nos. 5,668,239 and 5,739,253, for example, each disclose a one-shot process for the production of polyurethane/urea elastomers from isocyanate-terminated prepolymers, polyether polyols and a chain extender.

It would therefore be advantageous to develop an elastomer-forming composition in which a significant amount of the polyol component employed is a low monol polyoxypropylene diol which produces elastomers having hardness, modulus, compression deflection, abrasion resistance and processability comparable to those of elastomers currently produced exclusively with traditional high performance polyols.

SUMMARY OF THE INVENTION

It is an object of the present invention to provide a polyol component useful for producing polyurethane elastomers having good processing characteristics and physical properties even when the processing time is longer than 2 minutes which includes a significant amount of low cost, low monol polyoxypropylene polyol.

It is another object of the present invention to provide an NCO-terminated prepolymer or quasi-prepolymer useful for the production of polyurethane elastomers having characteristics comparable to those of elastomers produced solely with high performance polyols such as PTMEG, polycaprolactones and polyesters.

It is a further object of the present invention to provide polyurethane elastomers characterized by good hardness, modulus, elongation, abrasion resistance and compression properties.

It is an additional object of the present invention to provide an economical process for the production of polyurethane elastomers having good mechanical properties in which processing of the elastomer-forming materials does not require unacceptably short reaction times.

These and other objects which will be apparent to those skilled in the art are accomplished by using a polyol component which is a mixture or blend having a number average molecular weight of from about 1000 to about 3000 Daltons. This polyol component must include: (1) a significant amount (i.e., greater than 55% by weight, preferably, greater than 60% by weight, based on total weight of polyol component) of a low monol polyoxypropylene polyol having a number average molecular weight of from about 1000 to 12,000 Da, preferably, from about 2000 to about 12,000 Da and a degree of unsaturation less than or equal to 0.02 meq/g and (2) a minor amount (i.e., less than 35% by weight, preferably, less than 40% by weight, based on total polyol component) of a low molecular weight polyol having a high polydispersity index (i.e., the polydispersity index is greater than 1.1). This polyol component is reacted with an isocyanate, an isocyanate-terminated prepolymer or an isocyanate-terminated quasi-prepolymer. The elastomers produced in accordance with the present invention are most preferably synthesized by chain extension of an isocyanate-terminated prepolymer or quasi-prepolymer prepared by reacting a stoichiometric excess of one or more di- or polyisocyanates with at least a portion of the polyol component or one of the polyols of the polyol component.

DESCRIPTION OF THE PREFERRED EMBODIMENTS

The polyurethane elastomers produced in accordance with the present invention are preferably prepared by chain extension of an isocyanate-terminated prepolymer or quasi-prepolymer with one or more conventional chain extenders. The isocyanate-terminated prepolymer may be prepared by reacting one or more di- or polyisocyanates with a polyol component having a number average molecular weight of from about 1000 to about 3000 Daltons. This polyol component includes (1) a low monol-content polyoxypropylene polyol, and (2) a low molecular weight polyol having a polydispersity index greater than 1.1. Quasi-prepolymers formed by first reacting an isocyanate with a minor amount of the total polyol component (e.g., 10 equivalent percent) are reacted with the elastomer formulation resin side (B-side) containing the remainder of the polyol component and a chain extender to produce elastomers in accordance with the present invention. The elastomers of the present invention may be produced by any of the processes known to those skilled in the art, including one-shot processes.

The isocyanates useful by themselves and for preparing isocyanate-terminated prepolymers and isocyanate-terminated quasi-prepolymers for the production of elastomers in accordance with the present invention include any of the known aromatic, aliphatic, and cycloaliphatic di- or polyisocyanates. Examples of suitable isocyanates include: 2,4- and 2,6-toluene diisocyanates and isomeric mixtures thereof, particularly an 80:20 mixture of the 2,4- and 2,6-isomers; 2,2'-, 2,4'- and particularly 4,4'-methylenediphenylene diisocyanate and isomeric mixtures thereof; polyphenylene polymethylene polyisocyanates (poly-MDI, PMDI); the saturated, cycloaliphatic analogs of PMDI such as 2,4-, and 2,6-methylcyclohexane diisocyanate and 2,2'-, 2,4'-, and 4,4'-methylene dicyclohexylene diisocyanate and other isomers thereof; isophorone diisocyanate; 1,4-diisocyanatobutane; 1,5-diisocyanatopentane; 1,6-diisocyanatohexane; 1,4-cyclohexane diisocyanate; and the like.

Modified di- and polyisocyanates may also be used in the practice of the present invention. Suitable modified isocyanates include: urea modified isocyanates; biuret modified isocyanates; urethane modified isocyanates; isocyanurate modified isocyanates; allophanate modified isocyanates; carbodiimide modified isocyanates; uretdione modified isocyanates; uretonimine modified isocyanates; and the like. Such modified isocyanates are commercially available, and are prepared by reacting an isocyanate with a less than stoichiometric amount of an isocyanate-reactive compound, or with itself. For example, urea-modified isocyanates and urethane modified isocyanates may be prepared by reacting a di- or polyisocyanate with minor quantities of water or a diamine, or with a glycol, respectively. Carbodiimide-, uretonimine-, and isocyanurate-modified isocyanates are prepared by inter-reaction of isocyanates with themselves in the presence of a suitable catalyst.

Particularly preferred among the isocyanates listed above are toluene diisocyanates (TDI), methylene diphenylene diisocyanates (preferably 4,4'-MDI), carbodiimide modified MDI, and aliphatic and cycloaliphatic isocyanates (particularly 1,6-diisocyanatohexane and isophorone diisocyanate; the various methylcyclohexylene diisocyanates; and the various methylene dicyclohexylene diisocyanates. Mixtures of isocyanates are also suitable, in particular mixtures of TDI and MDI, and mixtures of MDI and carbodiimide-modified MDI.

The low molecular weight polyols having a polydispersity index greater than 1.1 which are useful in the present invention include any of the known polyols which satisfy the following criteria: (1) the number average molecular weight is from about 400 up to about 1000 Daltons; and (2) the ratio of the weight average molecular weight to the number average molecular weight (polydispersity index) is greater than 1.1, preferably greater than 1.2 and most preferably greater than 1.3. Suitable polyols include polyether polyols and polyester polyols which satisfy the above-listed criteria. These low molecular weight, high dispersity polyols are typically difunctional. Minor amounts of higher functionality polyols (e.g., less than about 20 percent by weight, preferably less than 10 percent by weight, and most preferably less than 5 percent by weight relative to total polyol having a polydispersity index greater than 1.1) which satisfy the above-listed criteria may be included.

The number average molecular weight of the polyol having a polydispersity index greater than 1.1 may be from about 400 up to about 1000 Da, preferably from about 500 up to 999 Da, and most preferably from about 600 up to 999 Da. Molecular weights and equivalent weights expressed herein in Da (Daltons) refer to number average molecular weights and number average equivalent weights, unless otherwise specified.

The low molecular weight polyol having the high polydispersity index is generally included in the polyol component of the present invention in an amount of from 5 to 45 wt. %, preferably from 5 to 40 wt. %, more preferably, from 10 to 30 wt. %, most preferably from 15 to 25 wt. %.

Specific examples of suitable low molecular weight, high polydispersity index polyols which are useful in the practice of the present invention include polytetramethylene ether glycols and polyester polyols which satisfy the above-listed criteria. Polytetramethylene ether glycols having molecular weights of from about 400 up to about 1000 Da and a polydispersity index of at least 1.3 are preferred.

Polytetramethylene ether glycols (PTMEG) satisfying the above-listed criteria are commercially available. PTMEGs are typically prepared by the ring-opening polymerization of tetrahydrofuran, generally in the presence of a Lewis acid catalyst. PTMEG polyols have a relatively high methylene to oxygen ratio and offer low water absorption and good hydrolytic stability. PTMEGs having molecular weights of from about 400 up to 1000 Da, preferably from about 500 up to 999 Da and a polydispersity index equal to or greater than 1.3 are particularly useful.

Polyester polyols are also commercially available. Such polyester polyols may be broadly classified as homopolymeric and co- and terpolymeric, although some of these terms are used interchangeably. Homopolymeric polyesters are prepared by polymerizing a monomer containing both hydroxyl and carboxylic acid functionalities or their chemical equivalents. The most common homopolymeric polyester is polycaprolactone, prepared by the inter-transesterification ring opening polymerization of $\epsilon$-caprolactone. Polycaprolactone polyesters have a uniform head/tail structure which promotes crystallinity. Other lactones and molecules having both hydroxyl and carboxylic functionalities are suitable for preparing polycaprolactone polyols. Addition of other di- or higher functionality hydroxyl-functional or carboxylic acid-functional molecules can be used to modify the functionality or structure of the polycaprolactone polyols.

Co- and terpolyester polyols are also commercially available, and are the reaction product of a stoichiometric excess of a diol and a dicarboxylic acid or esterifiable derivative thereof. When a single diol and single dicarboxylic acid are reacted, the resultant product is a copolyester, often termed simply a "polyester." Examples of such co-polyesters are: polyethyleneadipate, a polyester formed from ethylene glycol and adipic acid; polybutyleneadipate, a polyester formed from 1,4-butanediol and adipic acid; polyethyleneterephthalate, a polyester formed from ethylene glycol and terephthalic acid or an esterifiable or transesterifiable derivative such as dimethylterephthalate; and the like. When two or more glycols and/or two or more dicarboxylic acids are used in the polyesterification reaction, terpolyesters are produced. An example of such a terpolyester is polyethylenebutyleneadipate, prepared from a mixture of ethylene glycol, 1,4-butanediol, and adipic acid. Tri- or higher-functional polyols and tri- or higher functional carboxylic acids may be added, generally in minor quantities, to prepare polyester polyols with average functionalities greater than two.

Homopolymeric polyester polyols such as polycaprolactone, and copolyester polyols formed from but one diol and one dicarboxylic acid are also useful in the practice of the present invention.

The low monol polyoxypropylene polyol used in combination with the low molecular weight polyol having a polydispersity index greater than 1.1 is a key feature of the polyol component compositions of the present invention. Traditionally, polyoxypropylene polyols have been prepared by the base catalyzed oxypropylation of a suitably hydric, oxyalkylatable initiator molecule in the presence of a basic oxypropylation catalyst such as sodium or potassium hydroxide or a corresponding alkoxide. Under basic oxyalkylation conditions, some of the propylene oxide introduced rearranges to form allyl alcohol, an unsaturated monohydroxyl-functional compound which itself then serves as an additional oxyalkylatable initiator molecule. As this rearrangement continues during the course of the oxyalkylation, both the measured functionality and molecular weight distribution of the product change.

The continued introduction of monofunctional species lowers the overall functionality, and thus a 2000 Da equivalent weight, diol-initiated polyol may contain 40 to 50 mol percent or more of monofunctional species. As a result, the "nominal" or "theoretical" functionality of two due to the difunctionality of the diol initiator, may be lowered to about 1.6 to 1.7 or less. The relative amount of monol present is generally determined by measuring the unsaturation of the polyol, expressed as milliequivalents (meq) of unsaturation per gram of polyol, hereinafter, "meq/g". Unsaturation is measured in accordance with ASTMD-2849-69 "Testing Urethane Foam Polyol Raw Materials." Conventional, base-catalyzed polyoxypropylene diols in the 2000 Da equivalent weight range generally have measured unsaturations in the range of from 0.07 to 0.12 meq/g. Due to the high level of unsaturation and the high level of monofunctional species which the unsaturation reflects, the practical equivalent weight of polyoxypropylene diols produced by conventional base-catalyzed processes is limited to about 2000 Da.

Several methods for lowering unsaturation and the amount of monofunctional species have been proposed. Cesium and rubidium hydroxides have been used instead of the less expensive sodium and potassium hydroxides to lower unsaturation. (See, e.g., U.S. Pat. No. 3,393,243.) Barium and strontium hydroxides have also been used. (See, e.g., U.S. Pat. Nos. 5,010,187 and 5,114,619.) Use of metal carboxylate catalysts such as calcium naphthenate, with or without tertiary amines as co-catalysts is disclosed in U.S. Pat. No. 4,282,387. Such catalysts are alleged to have lowered the polyol unsaturation to the 0.04 meq/g range. However, the cost of such catalysts and the limited improvement in unsaturatlon level attributable to their use make commercial use of these catalysts unattractive.

Double metal cyanide complex catalysts such as those disclosed in U.S. Pat. No. 5,158,922, have made it possible to produce polyether polyols having a degree of unsaturation in the range of from 0.015 to 0.018 meq/g. These DMC catalysts have been improved to such an extent that polyols with exceptionally low levels of unsaturation, e.g., in the range of from 0.002 to 0.007 meq/g may be obtained. (See, e.g., U.S. Pat. Nos. 5,470,813 and 5,482,908). While the measurable unsaturation implies at least some monol content, low molecular weight species which would be expected to occur are difficult to detect with conventional gel permeation chromatography. Moreover, the polydispersities of the products are exceptionally low, so that the polyols are considered to be virtually monodisperse.

The polyoxypropylene polyols useful in the present invention are limited to those having low monol content. Specifically, the monol content in terms of polyol unsaturation must be lower than about 0.02 meq/g, preferably lower than 0.010 meq/g, and most preferably about 0.007 meq/g or lower. The polyoxyalkylene polyols are preferably difunctional, although minor amounts of higher functionality polyols may be used as well. The term "polyoxypropylene polyol" as used herein includes polyoxypropylene diols containing up to about 20 weight percent of tri- or higher-functionality polyoxypropylene species. The polyoxypropylene diols are preferably homopolyoxypropylene diols. However, random, block, or block/random copolymer diols containing up to 30 weight percent oxyethylene moieties, preferably not more than 20 weight percent oxyethylene moieties, may be used as well. Polyoxypropylene polyols containing minor amounts of higher alkylene oxide-derived moieties, particularly those derived from 1,2- and 2,3-butylene oxide may also be present in minor (i.e., less than 10% by weight) amounts. The term "polyoxypropylene polyol" includes such predominantly propylene oxide-derived polyoxyalkylene copolymers as well. Preferably, the polyoxypropylene polyols are substantially all propylene oxide-derived, and most preferably substantially difunctional. The molecular weights of the low monol polyoxypropylene polyols may range from at least 1000 Da to about 12,000 Da, preferably, from about 2000 Da to about 12,000 Da, more preferably from about 3000 to about 8000 Da, and most preferably from about 3000 to about 4500 Da.

The polyol component used in the practice of the present invention has an average molecular weight of from about 1000 to about 3000 Da, preferably from about 1000 to about 2500 Da, most preferably from about 1000 to about 2000 Da. The average degree of unsaturation of the polyol component is generally less than 0.02 meq/g, preferably less than 0.01 meq/g, most preferably, less than 0.007 meq/g. The amounts of low molecular weight polyol having a polydispersity index greater than 1.1 and low monol polyoxypropylene polyol and any other isocyanate-reactive material present in the polyol component are such that the total polyol component will have an average molecular weight and an average degree of unsaturation within these specified ranges. However, the low monol polyoxylpropylene polyol must comprise at least 60% by weight, preferably at least 70% by weight, most preferably, at least 75% by weight of the total polyol component.

The isocyanate-terminated prepolymers or quasi-prepolymers of the present invention will generally have an isocyanate group content expressed in weight percent (% NCO) of from 3 to 20% NCO, preferably from 4 to 14% NCO, and most preferably from 4 to 10% NCO. The prepolymers may be prepared by any of the conventional techniques. For example, a suitable isocyanate-terminated prepolymer may be obtained by reacting a mixture of a low molecular weight polyol having a polydispersity greater than 1.1 and a low monol polyoxypropylene polyol with a sufficient stoichiometric excess of isocyanate to provide the desired isocyanate group content. It is also possible to use a prepolymer mixture formed, for example, by reacting an isocyanate with a stoichiometric excess of only the low molecular weight polyol having a polydispersity greater than 1.1 to form a first prepolymer and reacting an excess of the isocyanate with the low monol polyoxypropylene polyol to form a second prepolymer and combining these two prepolymers. The prepolymer reactive components are preferably reacted neat under a nitrogen blanket at temperatures ranging from room temperature to about 100° C., preferably in the range of 40 °to 80° C. Urethane group-promoting catalysts such as tin catalysts may be added if desired, but are not ordinarily necessary. Prepolymer preparation methods are well known, and may be found, for example in the *Polyurethane Handbook*, G. Oertel, Ed., Hanser Publications, Munich, 1985, or the treatise by J. H. Saunders and K. C. Frisch, *Polyurethanes: Chemistry and Technology*, Interscience Publishers, New York, 1963.

Chain extenders useful in preparing elastomers in accordance with the present invention include the common diol chain extenders such as ethylene glycol, diethylene glycol, triethylene glycol, propylene glycol, dipropylene glycol, tripropylene glycol, 1,4-butanediol, 1,6-hexanediol, neopentyl glycol, O,O'-bis(2-hydroxyethyl)-hydroquinone, 1,4-cyclo-hexanedimethanol, 1,4-dihydroxycyclohexane, and the like. Ethylene glycol, propylene glycol, 1,4-butanediol and 1,6-hexanediol are preferred. 1,4-butanediol is particularly preferred.

Minor amounts of cross-linking agents such as glycerine, trimethylolpropane, diethanolamine, and triethanolamine may be used in conjunction with the diol chain extenders, but are not preferred.

Aromatic amine chain extenders are also useful in the practice of the present invention. Preferred amine chain extenders are aromatic amines such as the various toluene diamines and methylenedianilines, and particularly substituted aromatic amines which provide slower reaction attributable to electronic or steric effects, such as MOCA (4,4'-methylene-bis-o-chloroaniline), M-CDEA (4,4'-methylenebis(3-chloro-2,6-diethy-laniline) and the various aralkylated toluenediamines and methylenedianilines. Mixtures of various types of chain extenders may also be used.

The isocyanate-terminated prepolymers are reacted with chain extenders and optional cross-linking agents at an isocyanate index of from 70 to 130, preferably from 90 to 110, and most preferably 95 to 105. The elastomers formed by this reaction preferably have hardnesses in the range of Shore A 50 to Shore D 60, preferably from Shore A 60 to Shore A 95. Both harder and softer elastomers may be prepared as well. The prepolymer may be cured with heat, with the aid of catalysts such as dibutyltin diacetate, stannous octoate, or dibutyltin dilaurate, amine catalysts, or a combination thereof. If microcellular elastomers are desired, a small quantity of physical or chemical blowing agent, particularly water, may be added; or the curing elastomer may be frothed by intensive mixing with air, nitrogen, or $CO_2$; or liquid $CO_2$ may be incorporated in the curable elastomer reactive mixture. Water is a preferred blowing agent and is preferably used in an amount which provides a microcellular elastomer having a density in the range of from 0.15 to 0.8 $g/cm^3$, preferably from 0.2 to 0.5 $g/cm^3$.

The reactive mixture of isocyanate-terminated prepolymer, chain extender(s), optional blowing agents, pigments, thermal and UV stabilizers, fillers, reinforcing agents, cross-linking agents, and other additives and auxiliaries may be intensively mixed, injected into a suitable mold, extruded, or deposited on a moving belt. If substantially all reactive components are difunctional, an extruded or belt-deposited elastomer may subsequently be granulated and remelted (i.e., such elastomer will be a thermoplastic polyurethane (TPU)). The TPU may be introduced into an extruder or other device, remelted, and injection molded, blow molded, etc., to form a wide variety of products.

In the quasi-prepolymer technique, a quasi-prepolymer is prepared from excess isocyanate and only a minor portion of the polyol component or a portion of at least one polyol of the polyol component in the same manner as the isocyanate-terminated prepolymers described above. Due to the lesser amount of polyol component reacted with the isocyanate, however, the % NCO contents of quasi-prepolymers are higher than the % NCO of prepolymers. Isocyanate group contents of from 14 to 20% NCO are typical for such quasi-prepolymers. When using quasi-prepolymers, the remainder of the polyol component will be introduced together with the diol chain extender, either as a blend, or as a separate stream to a mixhead.

A particularly useful quasi-prepolymer technique utilizes all or virtually all of the low monol polyoxyalkylene diol and none or virtually none of the low molecular weight polyol having a polydispersity index greater than 1.1 during preparation of the quasi-prepolymer. The quasi-prepolymer thus prepared is then chain extended with the low molecular weight polyol having a polydispersity greater than 1.1 and chain extender by supplying both of these components in the B-side of the formulation. The relative amounts of low molecular weight polyol having a poly-dispersity greater than 1.1 and low monol polyoxyalkylene diol are adjusted between the amounts contained in the quasi-prepolymer and B-side such that the elastomer product contains from 55 to 95% by weight, preferably, from 60 to 95% by weight, of the low monol polyoxyalkylene polyol relative to from about 5 to about 45% by weight, preferably, from 5 to about 40% by weight of low molecular weight polyol having a polydispersity index greater than 1.1.

One-shot techniques are also useful in the practice of the present invention. In the one-shot technique, the isocyanate component is not pre-reacted with any substantial portion of the polyol component, the entire or virtually entire polyol component and chain extender are supplied to the mixhead in a stream or streams separate from the isocyanate component. When the one-shot process is employed, it is desirable that a portion of the polyol component be a low monol polyoxyethylene capped poly-oxypropylene diol, or that a minor proportion of high primary hydroxyl conventional polyoxypropylene diol be included in the formulation unless long demold and cure times can be tolerated.

Having generally described this invention, a further understanding can be obtained by reference to certain specific examples which are provided herein for purposes of illustration only and are not intended to be limiting unless otherwise specified.

EXAMPLES

The materials used in the Examples were as follows:

POLYOL A Polytetramethylene ether glycol having a number average molecular weight of 2,000.

POLYOL B A propylene oxide-based diol having a number average molecular weight of 4,000 and a degree of unsaturation of 0.005 meq/g.

POLYOL C A propylene oxide-based diol having a number average molecular weight of 4,000, with 15% internal ethylene oxide and a degree of unsaturation of 0.005 meq/g.

POLYOL D A propylene oxide-based diol having a number average molecular weight of 4,000 with 30% internal ethylene oxide and a degree of unsaturation of 0.005 meq/g.

POLYOL E A propylene oxide-based diol having a number average molecular weight of 4,000 with 40% internal ethylene oxide and a degree of unsaturation of 0.005 meq/g.

POLYOL F A propylene oxide-based diol with 10% random internal ethylene oxide having a number average molecular weight of 3,000 and a degree of unsaturation of 0.005 meq/g.

POLYOL G A polypropylene oxide-based diol having a number average molecular weight of 8,000 and a degree of unsaturation of 0.005 meq/g.

POLYOL H A polyethylene glycol having a number average molecular weight of 600 and a polydispersity index of 1.01.

POLYOL I A polytetramethylene ether glycol having a number average molecular weight of 650 and a polydispersity index of 1.6.

POLYOL J A polypropylene glycol having a number average molecular weight of 650 and a polydispersity index of 1.1 which is prepared by blending 21.6 wt. % of a polypropylene glycol having a molecular weight of 425 and 74.8 wt. % of a polypropylene glycol having a molecular weight of 760.

POLYOL K A polypropylene glycol having a number average molecular weight of 650 and a polydispersity index of 1.65 which is prepared by blending 5 wt. % of a low unsaturation polypropylene glycol having a molecular weight of 4000 (commercially available from Bayer Corporation under the name Acclaim 4200), 15 wt. % low unsaturation polypropylene glycol having a molecular weight of 2000 (commercially available from Bayer Corporation under the name Acclaim 2200), 30 wt. % of a low unsaturation polypropylene glycol having a molecular weight of 1000 (commercially available from Bayer Corporation under the name PPG-1000), 25 wt. % of a low unsaturation polypropylene glycol having a molecular weight of 760 (commercially available from Bayer Corporation under the name PPG-725), 17 wt. % of a low unsaturation polypropylene glycol having a molecular weight of 425 (commercially available from Bayer Corporation under the name PPG-425), and 8 wt. % of tripropylene glycol.

POLYOL L A polytetramethylene ether glycol having a number average molecular weight of 250 having a polydispersity index of 1.1.

POLYOL M A propylene oxide-based diol with 20% random internal oxyethylene moiety having an average molecular weight of 4000 and a degree of unsaturation of 0.005 meq/g.

BDO 1,4-Butanediol.

ISOCYANATE 4,4'-diphenylmethane diisocyanate.

Examples 1-5 and Comparative Examples C1-C7

Polyurethane elastomers were prepared by chain extending an NCO-terminated prepolymer having an NCO content of 6% with 1,4-butanediol at an isocyanate index of 105. The isocyanate index was kept constant to facilitate comparison of the various formulations. Each prepolymer tested was prepared by reacting a stoichiometric excess of 4,4'-MDI with one or more polyether diols such that the polyol component had an average equivalent weight of 1000 Da. In one comparative example, the prepolymer was made by reacting 4,4'-MDI with only a polyoxypropylene diol (i.e., no PTMEG). The specific polyol components employed to make these prepolymers and elastomers are given in Table 1A. The reaction mixture was then introduced into a mold where it was allowed to cure for 16 hours at 105° C. The elastomers were then demolded and conditioned for 4 weeks. The physical properties of the product polyurethane elastomers were then measured. The results are reported in Table 1B.

TABLE 1A

| Ex. | C-1 | C-2 | C-3 | 1 | 2 | 3 | C-4 | 4 | 5 | C-5 | C-6 | C-7 |
|---|---|---|---|---|---|---|---|---|---|---|---|---|
| Polyol A, pbw | 100 | — | 40 | — | — | — | — | — | — | — | — | — |
| Polyol B, pbw | — | 100 | 60 | 80.6 | — | — | — | — | — | 93.3 | 82.4 | 80.6 |
| Polyol C, pbw | — | — | — | — | 80.6 | — | — | — | — | — | — | — |
| Polyol D, pbw | — | — | — | — | — | 80.6 | — | — | — | — | — | — |
| Polyol E, pbw | — | — | — | — | — | — | 80.6 | — | — | — | — | — |
| Polyol F, pbw | — | — | — | — | — | — | — | 86.2 | 39.7 | — | — | — |
| Polyol G, pbw | — | — | — | — | — | — | — | — | 39.7 | — | — | — |
| Polyol H, pbw | — | — | — | — | — | — | — | — | — | — | 17.6 | — |
| Polyol I, pbw | — | — | — | 19.4 | 19.4 | 19.4 | 19.4 | 13.8 | 20.7 | — | — | — |
| Polyol J, pbw | — | — | — | — | — | — | — | — | — | — | — | 19.4 |
| Polyol K, pbw | — | — | — | — | — | — | — | — | — | — | — | — |
| Polyol L, pbw | — | — | — | — | — | — | — | — | — | 6.7 | — | — |
| $M_w/M_n$ low mol. wt. Polyol | — | — | — | 1.6 | 1.6 | 1.6 | 1.6 | 1.6 | 1.6 | 1.1 | 1.01 | 1.1 |
| BDO pbw | 8.4 | 7.9 | 8.1 | 8.4 | 8.4 | 8.4 | 8.4 | 8.4 | 8.4 | 8.4 | 8.4 | 8.4 |
| ISO pbw | 37.0 | 29.3 | 32.4 | 37.0 | 37.0 | 37.0 | 37.0 | 37.0 | 37.0 | 37.0 | 37.0 | 37.0 |
| NCO/OH | 2.96 | 4.70 | 3.70 | 2.96 | 2.96 | 2.96 | 2.96 | 2.96 | 2.96 | 2.96 | 2.96 | 2.96 |
| Av. Mol. wt. Blend | 2000 | 4000 | 2000 | 2000 | 2000 | 2000 | 2000 | 2000 | 2000 | 2000 | 2000 | 2000 |

TABLE 1B

| Ex./Prop. | C-1 | C-2 | C-3 | 1 | 2 | 3 | C-4 | 4 | 5 | C-5 | C-6 | C-7 |
|---|---|---|---|---|---|---|---|---|---|---|---|---|
| Hard., Shore A[1] | 84 | 75 | 80 | 79 | 80 | 80 | 76 | 76 | 79 | 83 | 77 | 80 |
| % Rebound[2] | 71 | 69 | 72 | 64 | 63 | 64 | 65.5 | 67 | 60 | 62 | 66 | 58 |
| T. Str., psi[3] | 6320 | 3325 | 3450 | 3661 | 3649 | 3556 | 1880 | 2972 | 3202 | 2215 | 1922 | 2318 |
| % Elong.[4] | 551 | 930 | 760 | 785 | 687 | 642 | 579 | 703 | 816 | 581 | 474 | 687 |
| 100% Mod., psi[5] | 763 | 506 | 610 | 665 | 625 | 636 | 390 | 586 | 612 | 696 | 454 | 573 |
| 200% Mod., psi[6] | 1040 | 729 | 860 | 926 | 893 | 917 | 586 | 834 | 828 | 992 | 705 | 800 |
| 300% Mod., psi[7] | 1430 | 952 | 1120 | 1180 | 1180 | 1237 | 822 | 1098 | 1040 | 1257 | 1015 | 1025 |
| 400% Mod, psi[8] | 2096 | 1190 | 1400 | 1463 | 1521 | 1653 | 1119 | 1415 | 1212 | 1552 | 1453 | 1266 |
| Die C Tear, pli[9] | 374 | 389 | 400 | 402 | 259 | 269 | 273 | 375 | 419 | 204 | 169 | 417 |
| % Comp. Set[10] | 25.5 | 16.0 | — | 16.1 | 20.8 | 21.8 | 35.0 | 17.7 | 17.1 | 25.3 | 17.7 | 13.0 |
| Taber Abr.[11] | 52.3 | 182.7 | 151.0 | 97.4 | 97.3 | 88.5 | 101.1 | 78.4 | 110.1 | 144.6 | 210.1 | 171.1 |
| Comp. Defl. 5%, psi[12] | 138 | 68 | — | 107 | 116 | 96 | 83 | 90 | 102 | 136 | 75 | 103 |
| Comp. Defl. 10%, psi[13] | 289 | 167 | — | 221 | 246 | 207 | 177 | 195 | 218 | 278 | 166 | 220 |
| Comp. Defl. 15%, psi[14] | 441 | 267 | — | 334 | 375 | 323 | 276 | 303 | 331 | 414 | 261 | 338 |
| Comp. Defl. 25%, psi[15] | 776 | 493 | — | 582 | 662 | 586 | 503 | 550 | 583 | 711 | 486 | 606 |

[1]Hardness, Shore A (ASTM D2240)
[2]Pendulum Rebound, % (ASTM D1054)
[3]Tensile Strength, pounds per square inch (ASTM D412)
[4]Elongation at break, % (ASTM D412)
[5]100% Modulus, pounds per square inch (ASTM D412)
[6]200% Modulus, pounds per square inch (ASTM D412)
[7]300% Modulus, pounds per square inch (ASTM D412)
[8]400% Modulus, pounds per square inch (ASTM D412)
[9]Die C Tear, pounds per linear inch (ASTM D624)
[10]Compression Set, % (ASTM D395, Method B)
[11]Taber Abrasion, mg loss/1000 revolutions
[12]Compression Deflection: Stress @ 5% compression, pounds per square inch (ASTM D575, Method A)
[13]Compression Deflection: Stress @ 10% compression, pounds per square inch (ASTM D575, Method A)
[14]Compression Deflection: Stress @ 15% compression, pounds per square inch (ASTM D575, Method A)
[15]Compression Deflection: Stress @ 25% compression, pounds per square inch (ASTM D575, Method A)

As can be seen from Tables 1A and 1B, Comparative Example C-2 shows that when a low monol polyoxyproylene diol having a molecular weight of 4000 was used as the only polyol, the product elastomer was softer than that made with only PTMEG-2000 (Example C-1). The elastomer of C-2 also had a lower modulus, poor abrasion resistance and low compression deflection (load bearing) properties. During the chain extension process, it was also found that the elastomer made from the composition of Example C-2 had poor green strength.

To improve the quality of the elastomers made with low monol polyoxyalkylene diols, a blend of the low monol diol having a molecular weight of 4000 and PTMEG-2000 was used in Comparative Example C-3. Although the elastomer made with this blend did have an increased Shore A hardness, the abrasion resistance was still unacceptable. The large amount of high cost PTMEG used in this formulation makes use of this blend commercially unattractive.

Blends of low monol polyoxyalkylene glycol with a low molecular weight polyol were also tested to determine whether inclusion of the low molecular weight polyol would improve the physical properties of elastomers made with those blends.

When the low molecular weight polyol employed had a poly-dispersity (as measured by gel permeation chromatography) of less than 1.1 (See Comparative Examples C-5, C-6 and C-7), the resulting elastomer had low tensile strength and abrasion resistance. Additionally, some of those elastomers (Examples C-5 and C-6) had very poor tear strength.

When a low molecular weight polyol having a broad molecular weight distribution (i.e., a polydispersity index greater than 1.1) was used with a low monol polyoxyalkylene glycol (See Examples 1-5), the resulting elastomers had improved hardness, modulus, compression deflection, tensile strength, and abrasion resistance. Their processability, as determined by green strength, was also greatly improved.

In Examples 1-3 and Comparative Example C-4, a low monol diol having a molecular weight of 4000 was used as the high molecular weight polyol. The percent random internal oxyethylene moiety present in this high molecular weight was varied from 0% (Example 1) to 15% (Example 2) to 30% (Example 3) and 40% (Example C-4). POLYOL I (having a polydispersity index of approximately 1.6) was also used as a low molecular weight polyol in each of Examples 1, 2, 3 and C-4. From the properties of these elastomers reported in Table 1 B, it is apparent that use of high molecular weight polyol having 40% random internal oxyethylene moiety present results in an elastomer with diminished mechanical properties such as tensile strength, elongation, modulus, and compression set.

In Example 4, a low monol diol having a molecular weight of 3000 and containing 10% random internal oxyethylene moieties was used in combination with an amount of POLYOL I sufficient to result in an average molecular weight for the blend of 2000 Da. In Example 5, a 50/50 mixture of low monol diol having a molecular weight of 3000 containing 10% random internal oxyethylene moieties and a low monol polyoxypropylene glycol having a molecular weight of 8000 Da was used as the high molecular weight portion of the polyol component. The elastomers produced from such high molecular weight low monol polyol and low molecular weight polyol having a polydispersity index greater than 1.1 had excellent properties and processing characteristics. The abrasion resistance of the elastomers produced in Examples 4 and 5 was particularly good.

Examples 6-9 and Comparative Examples C-8-C-13

Isocyanate-terminated prepolymers were prepared in the same manner as those prepared in Examples 1-5 and C-1-C-7 and then chain extended to form elastomers. However, the prepolymers used in these Examples 6-9 and C-8-C-13 had an NCO content of 8%. The specific 30 amounts of the specific materials used to produce these elastomers are given in Table 2A. The properties of the elastomers produced in these Examples are reported in Table 2B.

polymer having a higher NCO content, the tensile strength of that elastomer was still 7% lower than that of the elastomer produced in Example C-2.

In contrast, elastomers produced with a polyol component which includes both a high molecular weight, low monol polyoxyalkylene glycol and a low molecular weight polyol having a polydispersity greater than 1.1 had greatly improved mechanical properties and processing characteristics.

In Examples 6, 7 and Comparative C-10, a low monol diol having a molecular weight of 4000 and an internal oxyethylene moiety content of 0% (Example 6), 20% (Example 7) or 40% (Example C-10) was used as the high molecular weight polyol. POLYOL I was used as the low molecular weight

TABLE 2A

| Ex./Mat'l | C-8 | C-9 | 6 | 7 | C-10 | 8 | C-11 | C-12 | C-13 | 9 |
|---|---|---|---|---|---|---|---|---|---|---|
| Polyol A pbw | 100 | — | — | — | — | — | — | — | — | — |
| Polyol F pbw | — | — | — | — | — | 86.62 | — | — | — | 80.2 |
| Polyol B pbw | — | 100 | 80.76 | — | — | — | 93.52 | 82.4 | 80.6 | — |
| Polyol M pbw | — | — | — | 80.6 | — | — | — | — | — | — |
| Polyol E pbw | — | — | — | — | 80.6 | — | — | — | — | — |
| Polyol H pbw | — | — | — | — | — | — | — | 17.6 | — | — |
| Polyol I pbw | — | — | 19.24 | 19.4 | 19.4 | 13.38 | — | — | — | — |
| Polyol J pbw | — | — | — | — | — | — | — | — | 19.4 | — |
| Polyol K pbw | — | — | — | — | — | — | — | — | — | 19.8 |
| Polyol L pbw | — | — | — | — | — | — | 6.48 | — | — | — |
| $M_w/M_n$ low mol. wt. Polyol | — | — | 1.6 | 1.6 | 1.6 | 1.6 | 1.1 | 1.01 | 1.1 | 1.65 |
| BDO, pbw | 12.1 | 11.4 | 12.1 | 12.1 | 12.1 | 12.1 | 12.1 | 12.1 | 12.1 | 12.5 |
| ISO, pbw | 47.7 | 39.5 | 47.7 | 47.7 | 47.7 | 47.7 | 47.7 | 47.7 | 47.7 | 50.0 |
| NCO/OH | 3.87 | 6.22 | 3.87 | 3.83 | 3.83 | 3.87 | 3.83 | 3.83 | 3.83 | 3.50 |
| % NCO | 8.00 | 8.00 | 8.00 | 8.00 | 8.00 | 8.00 | 8.00 | 8.00 | 8.00 | 8.00 |
| Av. Mol. Wt. Blend | 2000 | 4000 | 2000 | 2000 | 2000 | 2000 | 2000 | 2000 | 2000 | 1750 |

TABLE 2B

| Ex./Prop. | C-8 | C-9 | 6 | 7 | C-10 | 8 | C-11 | C-12 | C-13 | 9 |
|---|---|---|---|---|---|---|---|---|---|---|
| Hardness, Shore A[1] | 90 | 85 | 89 | 90 | 88 | 86 | 90 | 85 | 89.5 | 88 |
| % Rebound[2] | 64 | 64 | 60 | 58.5 | 59.5 | 61 | 59 | 66 | 53 | 51 |
| Tensile Strength, psi[3] | 6921 | 3107 | 3821 | 3986 | 2968 | 3681 | 2813 | 2584 | 3244 | 3959 |
| % Elong.[4] | 581 | 865 | 766 | 674 | 616 | 692 | 579 | 566 | 793 | 600 |
| 100% Mod., psi[5] | 1083 | 777 | 1019 | 958 | 749 | 911 | 991 | 830 | 893 | 962 |
| 200% Mod., psi[6] | 1450 | 1051 | 1331 | 1277 | 1013 | 1224 | 1370 | 1203 | 1186 | 1340 |
| 300% Mod., psi[7] | 1955 | 1296 | 1614 | 1605 | 1308 | 1525 | 1668 | 1576 | 1430 | 1717 |
| 400% Mod., psi[8] | 2820 | 1542 | 1923 | 2001 | 1685 | 1871 | 1980 | 1973 | 1671 | 2181 |
| Die C Tear, pli[9] | 414 | 474 | 537 | 404 | 332 | 490 | 234 | 216 | 379 | 362 |
| % Comp. Set[10] | 19 | 16 | 19 | 18.4 | 17.8 | 17 | 25 | 10.0 | 15.1 | ND* |
| Taber Abr[11] | 61 | 208.3 | 146 | 101.8 | 109.7 | 109.1 | 204.2 | 203.8 | 194.6 | 91.2 |
| Comp. Defl. 5%, psi[12] | 212 | 141 | 189 | 225 | 171 | 143 | 237 | 139 | 236 | 166 |
| Comp. Defl. 10%, psi[13] | 454 | 322 | 392 | 451 | 353 | 327 | 456 | 289 | 448 | 362 |
| Comp. Defl. 15%, psi[14] | 673 | 483 | 570 | 648 | 520 | 499 | 647 | 433 | 634 | 549 |
| Comp. Defl. 25%, psi[15] | 1149 | 832 | 935 | 1048 | 865 | 857 | 1053 | 760 | 1027 | 948 |

[1-15]Same meaning as in Table 1A.
*ND = Not determined

Higher NCO content prepolymers generally produce harder elastomers. The elastomer produced from the prepolymer made with POLYOL A (Example C-8) had a Shore A hardness of 90. The elastomer produced from the prepolymer made with POLYOL B alone (i.e., no PTMEG)(Example C-9), was softer than that made in Example C-8 and had lower modulus, poor abrasion resistance and low compression deflection (load bearing) characteristics. The disadvantages of using only a high molecular weight polyol such as POLYOL A are evidenced by the fact that even though the elastomer produced in Example C-8 was made from a prepolyol in each of these examples. As is apparent from Table 2B, the elastomers produced in Examples 6 and 7 had hardness, tensile strength, modulus, abrasion resistance and compression deflection properties which were superior to those of the elastomer produced in Comparative Example C-9. The elastomer produced in Comparative Example C-10 with a high molecular weight polyol having an internal oxyethylene moiety content greater than 30% had poorer mechanical properties, particularly, tensile strength, elongation, modulus, tear strength and compression deflection than the elastomers produced in Examples 6 and 7.

In Example 8, the high molecular weight polyol component used was a low monol diol having 10% random, internal oxyethylene moieties and a molecular weight of 3000. Sufficient POLYOL I was blended with this high molecular weight polyol (POLYOL F) to result in an overall average molecular weight of 2000 Da. Although blending down from a 3000 to a 2000 Da molecular weight resulted in slightly softer elastomer, the use of this blend resulted in a polyol component from which elastomers having excellent tensile strength, tear strength and abrasion resistance were made.

Comparative Examples C-11, C-12 and C-13 demonstrate that use of low molecular weight polyols having a low dispersity index, (i.e., a polydispersity of 1.1 or less) did not produce elastomers having acceptable properties and processing characteristics. The elastomers produced in Comparative Examples C-11, C-12 and C-13 exhibited low tensile strength and poor abrasion resistance.

In Example 9, the polyol component included a low molecular weight polypropylene glycol (POLYOL K) having a polydispersity index of 1.65 and a low unsaturation, high molecular weight polyol (POLYOL F). The elastomer produced from this polyol component had excellent tensile strength, abrasion resistance and other properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane comprising the reaction product of a prepolymer having an NCO content of from about 3 to about 20% which is the reaction product of
   a) a diisocyanate or polyisocyanate and
   b) a polyol composition having a number average molecular weight of from about 1,000 to about 3,000 Da comprising
      (1) at lease 60% by weight, based on total weight of the polyol composition, of a polyoxypropylene polyol having a molecular weight of from about 2,000 to about 12,000 Da, a random or block or block/random oxyethylene moiety content no greater than 30% by weight, based on weight of the polyoxypropylene polyol, and a degree of unsaturation less than or equal to 0.02 meq/g and
      (2) from 5 to 40% by weight, based on total weight of the polyol composition, of a polyol having a number average molecular weight of from about 400 to about 1,000 Da and a polydispersity index greater than 1.1 and a chain extender or crosslinking agent.

2. A polyurethane comprising the reaction product of a prepolymer having an NCO content of from about 3 to about 20% which is the reaction product of
   a) 4,4'-diphenylmethane diisocyanate and
   b) a polyol composition having a number average molecular weight of from about 1,000 to about 3,000 Da comprising
      (1) from 60 to 95% by weight, based on total weight of the polyol composition, of a polyoxypropylene polyol having a molecular weight of from about 2,000 to about 12,000 Da, a random or block or block/random oxyethylene moiety content no greater than 30% by weight, based on weight of the polyoxypropylene polyol, and a degree of unsaturation less than or equal to 0.02 meq/g and
      (2) from 5 to 40% by weight, based on total weight of the polyol composition, of a polytetramethylene ether glycol having a number average molecular weight of from about 400 to about 1000 Da and a polydispersity index greater than 1.1 with a chain extender or crosslinking agent.

3. The polyurethane of claim 2 in which the chain extender is a diol.

4. The polyurethane of claim 3 produced with butanediol as the chain extender.

5. The polyurethane of claim 1 produced with butanediol as the chain extender.

6. An elastomer produced by reacting
   (a) an NCO-terminated prepolymer or quasi-prepolymer which is the reaction product of:
      (1) a diisocyanate or polyisocyanate and
      (2) a polyoxypropylene polyol having a molecular weight of from about 2,000 to about 12,000 Da, an internal or block or block/random oxyethylene moiety content no greater than 30% and a degree of unsaturation less than or equal to 0.02 meq/g and
   (b) a polyol having a molecular weight of from about 400 to about 1,000 Da and a polydispersity index greater than 1.1 and
   (c) a chain extender in amounts such that weight percent of polyol (2) present in the elastomer relative to total of weight of polyol (2) plus weight of polyol (b) present in the elastomer is from 60 to 95% and weight percent of polyol (b) present in the elastomer relative to total of weight of polyol (2) plus weight of polyol (b) present in the elastomer is 5 to 40%.

7. A polyurethane elastomer produced by reacting
   (a) a diisocyanate or polyisocyanate with
   (b) a polyol composition having a number average molecular weight of from about 1,000 to about 3,000 Da comprising
      (1) at least 60% by weight, based on total weight of the polyol composition, of a polyoxypropylene polyol having a molecular weight of from about 2,000 to about 12,000 Da, a random or block or block/random oxyethylene moiety content no greater than 30% by weight, based on weight of the polyoxypropylene polyol, and a degree of unsaturation less than or equal to 0.02 meq/g and
      (2) from 5 to 40% by weight, based on total weight of the polyol composition, of a polyol having a molecular weight of from about 400 to about 1,000 Da and a polydispersity index greater than 1.1 in a one-shot process at an isocyanate index of from 70 to 130.

8. The polyurethane elastomer produced by reacting
   (a) an isocyanate-terminated quasi-prepolymer produced from a portion of a polyol composition having a number average molecular weight of from about 1,000 to about 3,000 Da comprising
      (1) at least 60% by weight, based on total weight of the polyol composition, of a polyoxypropylene polyol having a molecular weight of from about 2,000 to about 12,000 Da, a random or block or block/random oxyethylene moiety content no greater than 30% by weight, based on weight of the polyoxypropylene polyol, and a degree of unsaturation less than or equal to 0.02 meq/g and
      (2) from 5 to 40% by weight, based on total weight of the polyol composition, of a polyol having a molecular weight of from about 400 to about 1,000 Da and a polydispersity index greater than 1.1 with
   (b) the remainder of the polyol composition at an isocyanate index of from 70 to 130.

9. A one-shot process for the production of a polyurethane elastomer comprising
(1) introducing
(a) a polyol composition having a number average molecular weight of from about 1,000 to about 3,000 Da comprising
(i) at least 60% by weight, based on total weight of the polyol composition, of a polyoxypropylene polyol having a molecular weight of from about 2,000 to about 12,000 Da, a random or block or block/random oxyethylene moiety content no greater than 30% by weight, based on weight of the polyoxypropylene polyol, and a degree of unsaturation less than or equal to 0.02 meq/g and
(ii) from 5 to 40% by weight, based on total weight of the polyol composition, of a polyol having a molecular weight of from about 400 to about 1,000 Da and a polydispersity index greater than 1.1 and
(b) a chain extender and
(c) a diisocyanate or polyisocyanate into a vessel and
(2) allowing the contents of the vessel to react.

10. A polyurethane comprising the reaction product of
a) a diisocyanate or polyisocyanate, and
b) an isocyanate-reactive component comprising:
(1) from 55 to 95% by weight, based on total weight of isocyanate-reactive component, of a polyoxypropylene polyol having a molecular weight of at least 1,000 to about 12,000 Da, an internal or block or block/random oxyethylene moiety content no greater than 30% and a degree of unsaturation less than or equal to 0.02 meq/g and
(2) from 5 to 40% by weight, based on total weight of isocyanate-reactive component, of a polyol having a molecular weight of from about 400 up to 1,000 Da and a polydispersity index greater than 1.1 which is different from (1) and
c) a chain extender.

11. The polyurethane of claim 10 produced by reacting (a) and (b) in a one-shot process at an isocyanate index of from 70 to 130.

12. The polyurethane of claim 10 in which c) is a diol chain extender.

13. The polyurethane of claim 10 in which c) is butanediol.

14. A one-shot process for the production of the polyurethane of Claim 10 comprising:
(1) introducing (a), (b) and (c) into a vessel and
(2) allowing the contents of the vessel to react.

* * * * *